United States Patent
den Besten (10) Patent No.: US 11,296,858 B2
(45) Date of Patent: Apr. 5, 2022

(54) COMMUNICATIONS DEVICE AND METHOD OF COMMUNICATIONS

(71) Applicant: NXP B.V., Eindhoven (NL)

(72) Inventor: Gerrit Willem den Besten, Eindhoven (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/833,384

(22) Filed: Mar. 27, 2020

(65) Prior Publication Data

US 2020/0313839 A1   Oct. 1, 2020

Related U.S. Application Data (60) Provisional application No. 62/826,936, filed on Mar. 29, 2019.

(51) Int. Cl.
   *H04L 5/22* (2006.01)
   *H04L 5/14* (2006.01)

(52) U.S. Cl.
   CPC .............. *H04L 5/22* (2013.01); *H04L 5/1469* (2013.01)

(58) Field of Classification Search
   None
   See application file for complete search history.

(56) References Cited

U.S. PATENT DOCUMENTS

| | | | | |
|---|---|---|---|---|
| 4,920,567 | A | * | 4/1990 | Malek .................. H04W 12/03 380/33 |
| 5,864,545 | A | * | 1/1999 | Gonikberg ............. H04B 3/235 370/286 |
| 11,038,607 | B2 | | 6/2021 | Dalmia |
| 2015/0109969 | A1 | | 4/2015 | Celebi et al. |
| 2017/0134149 | A1 | | 5/2017 | Chini et al. |
| 2018/0007627 | A1 | * | 1/2018 | Azizi .................. H04L 27/2666 |
| 2018/0219654 | A1 | * | 8/2018 | Chen ................. H04W 72/0446 |
| 2019/0385057 | A1 | * | 12/2019 | Litichever ................ G06N 3/08 |
| 2020/0313840 | A1 | | 10/2020 | Den Besten |

OTHER PUBLICATIONS

Den Besten, Gerrit W. "Single-Pair Automotive PHY Solutions from 10Mb/s to 10Gb/s and Beyond", ISSCC 2019 / SESSION 30 / Advanced Wireline Techniques / 30.1, 2019, 3 pgs.
Non-Final Patent Application, Oct. 6, 2021, 40 pgs.

* cited by examiner

*Primary Examiner* — Hong Shao (57) ABSTRACT

Embodiments of a device and method are disclosed. In an embodiment, a method of communications involves determining a time-division multiplex (TDM) communications schedule over an asymmetrical point-to-point link and at a communications device, transmitting or receiving data according to the TDM communications schedule over the asymmetrical point-to-point link. The TDM communications schedule specifies multiple non-overlapping transmission time slots for different communications devices and a silent period for echo fade-out between consecutive transmission time slots of the non-overlapping transmission time slots.

18 Claims, 7 Drawing Sheets

COMMUNICATIONS DEVICE AND METHOD OF COMMUNICATIONS

CROSS-REFERENCE TO RELATED APPLICATIONS

The current application claims priority to U.S. Provisional Patent Application Ser. No. 62/826,936, filed Mar. 29, 2019, entitled "POWER-EFFICIENT ASYMMETRIC DATA TRANSMISSION OVER A FULL DUPLEX LINK," which is incorporated by reference herein.

BACKGROUND

In a communications network, it is generally desirable to have a network technology with efficient power and/or physical layer utilization. For example, in an in-vehicle network (IVN) (e.g., with sensor nodes such as cameras, radars, and/or light detection and ranging (LiDAR) sensors) where power supply can be limited and the dimension and cost of network components are typically constrained, a power and cost efficient network technology is desirable. However, typical network technology may not be able to provide efficient power and cost utilization that are suitable for a communications network with limited resources.

SUMMARY

Embodiments of a device and method are disclosed. In an embodiment, a method of communications involves determining a time-division multiplex (TDM) communications schedule over an asymmetrical communications link and at a communications device, transmitting or receiving data according to the TDM communications schedule over the asymmetrical communications link. The TDM communications schedule specifies multiple non-overlapping transmission time slots for different communications devices and a silent period for echo fade-out between consecutive transmission time slots of the non-overlapping transmission time slots.

In an embodiment, at the communications device, transmitting or receiving data according to the TDM communications schedule over the asymmetrical point-to-point link comprises at the communications device, transmitting or receiving data according to the TDM communications schedule over the asymmetrical point-to-point link without echo cancellation.

In an embodiment, communications in different directions of the asymmetrical point-to-point link occur at different data rates.

In an embodiment, the method further comprises determining a time duration of the silent period based on a communication channel length of the asymmetrical point-to-point link or based on a baud rate of the asymmetrical point-to-point link.

In an embodiment, the communications device does not include an echo canceller.

In an embodiment, the method further comprises training the asymmetrical point-to-point link prior to, at the communications device, transmitting or receiving the data according to the TDM communications schedule over the asymmetrical point-to-point link.

In an embodiment, training the asymmetrical point-to-point link comprises in a first direction of the asymmetrical point-to-point link, conducting continuous transmission from a first transceiver to a second transceiver while the second transceiver does not transmit data over the asymmetrical point-to-point link.

In an embodiment, training the asymmetrical point-to-point link further comprises, in a second direction of the asymmetrical point-to-point link that is opposite to the first direction, transmitting data from the second transceiver to the first transceiver to train the asymmetrical point-to-point link during a time slot assigned to the second transceiver while the first transceiver stops data transmission during the time slot assigned to the second transceiver.

In an embodiment, training the asymmetrical point-to-point link comprises extending a training transmit slot in a direction of training and reducing a transmission slot for a direction of the asymmetrical point-to-point link that is opposite to the direction of training.

In an embodiment, at the communications device, transmitting or receiving the data according to the TDM communications schedule over the asymmetrical point-to-point link comprises at the communications device, transmitting the data only during a fraction of an assigned transmission time slot according to the TDM communications schedule over the asymmetrical point-to-point link.

In an embodiment, the method further comprises adjusting the TDM communications schedule over the asymmetrical point-to-point link based on a bandwidth in one direction of the asymmetrical point-to-point link.

In an embodiment, the method further comprises adjusting a length of at least one of the non-overlapping transmission time slots of the TDM communications schedule.

In an embodiment, the method further comprises synchronizing with an Energy-Efficient Ethernet (EEE) communications schedule.

In an embodiment, at the communications device, transmitting or receiving the data according to the TDM communications schedule over the asymmetrical point-to-point link comprises at the communications device, transmitting the data only once during multiple TDM cycles over the asymmetrical point-to-point link.

In an embodiment, at least one of the non-overlapping transmission time slots contains time to transmit an integer number of data frames.

In an embodiment, wherein the communications device is part of an in-vehicle network (IVN).

In an embodiment, a communications device includes a controller configured to determine a TDM communications schedule over an asymmetrical point-to-point link and a transceiver configured to transmit or receive data according to the TDM communications schedule over the asymmetrical point-to-point link. The TDM communications schedule specifies a plurality of non-overlapping transmission time slots for different communications devices and a silent period for echo fade-out between consecutive transmission time slots of the non-overlapping transmission time slots.

In an embodiment, the transceiver is configured to transmit or receive the data according to the TDM communications schedule over the asymmetrical point-to-point link without echo cancellation.

In an embodiment, a wired communications network includes a wired transmission media and communications devices configured to communicate via the wired transmission media. Rach of the communications devices includes a controller configured to determine a TDM communications schedule over an asymmetrical point-to-point link through the wired transmission media and a transceiver configured to transmit or receive data according to the TDM communications schedule over the asymmetrical point-to-point link.

The TDM communications schedule specifies a plurality of non-overlapping transmission time slots for the communications devices and a silent period for echo fade-out between consecutive transmission time slots of the non-overlapping transmission time slots.

In an embodiment, the transceiver of each of the communications devices is configured to transmit or receive the data according to the TDM communications schedule over the asymmetrical point-to-point link without echo cancellation.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
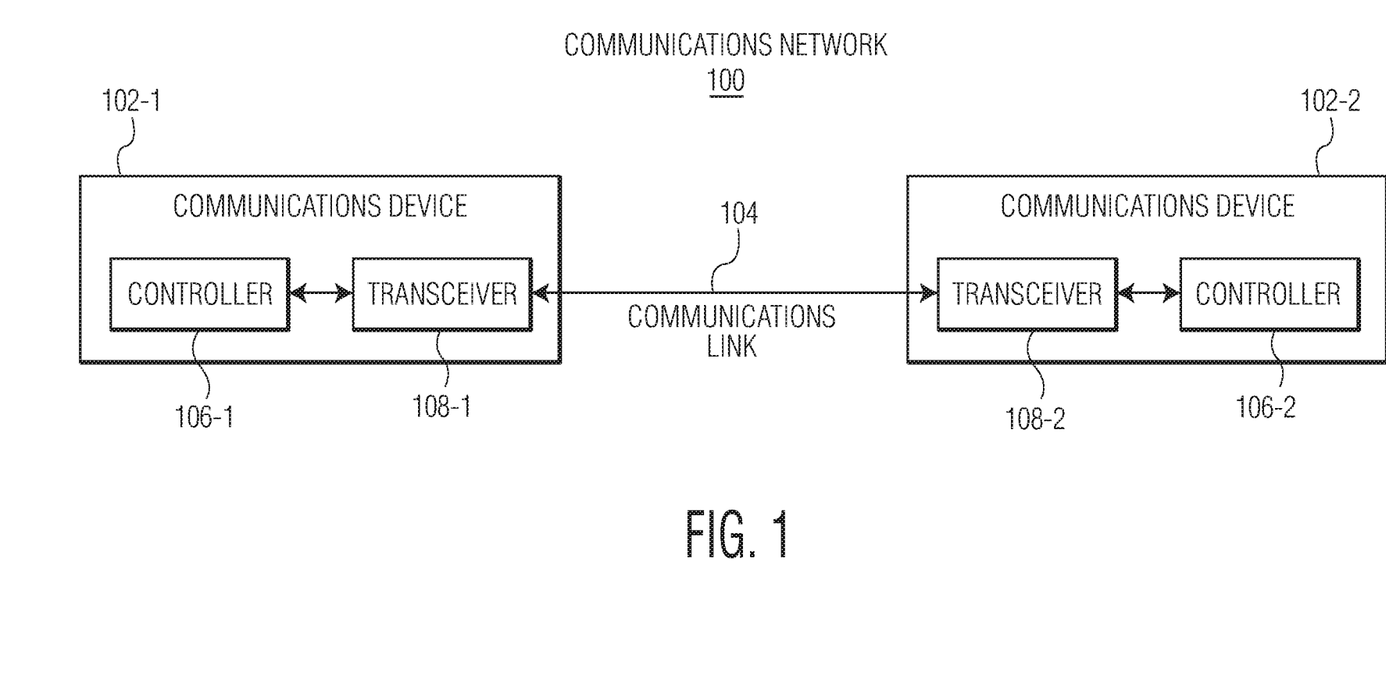
FIG. 1 depicts a communications network that includes multiple communications devices.

FIG. 1 depicts a communications network 100 that includes multiple communications devices 102-1, 102-2. The communications network can be used in various applications, such as automotive applications, communications applications, industrial applications, medical applications, computer applications, and/or consumer or appliance applications. In some embodiments, the communications devices are implemented in hardware (e.g., circuits), software, firmware, or a combination thereof. In some embodiments, the communications network is a wired communications network and the communications devices 102-1, 102-2 communicate through electrical cables or wires, which are made of conductive materials (e.g., metals). For example, the communications devices may communicate through one or more coaxial cables, twisted pair cables, or fiber optic cables. In some embodiments, the communications devices 102-1, 102-2 communications through a single shared transport medium, for example, a single twisted pair cable or coax as transmission channel, which reduces weight and cost of the communications medium. Although the illustrated communications network 100 is shown with certain components and described with certain functionality herein, other embodiments of the communications network may include fewer or more components to implement the same, less, or more functionality. For example, in some embodiments, the communications network includes more than two communications devices. In another example, although the communications devices are shown in FIG. 1 as being connected in certain topology, the network topology of the communications network is not limited to the topology shown in FIG. 1. In the embodiment depicted in FIG. 1, the communications devices 102-1, 102-2 are connected via a point-to point link 104. However, in other embodiments, the communications devices 102-1, 102-2 are connected in a different fashion. Examples of network topology that can also be used by the communications network include, without being limited to, point-to-point, star, bus, ring or circular, mesh, tree, or hybrid. Although the communications devices of the communications network 100 are shown in FIG. 1 as being connected to each other without any additional device, in some embodiments, the communications devices are connected through one or more intervening devices.

In some embodiments, the communications network 100 is an in-vehicle network (IVN) and the communications devices 102-1, 102-2 includes at least one sensor node configured to sense an environmental or operational parameter or data, for example, within a vehicle and/or surrounding a vehicle, at least one actuator, and/or at least one display. Examples of sensor nodes include, without being limited to, image sensors/cameras such as video sensors/cameras, and radars (e.g., Doppler radars)). In some embodiments, the communications devices 102-1, 102-2 includes an electronic control unit (ECU), which is configured to control one or more electronic components within an automobile system such as a vehicle.

In the embodiment depicted in FIG. 1, communications between the communications devices 102-1, 102-2 are "asymmetrical." In asymmetrical communications, communications in different directions of an asymmetrical communications link 104 (e.g., a point-to-point link) between the communications devices 102-1, 102-2 occur at different data rates. In some embodiments, communications in one direction, e.g., on the forward channel, occur at a higher rate than in the other direction, e.g., on the backward channel. For example, a high data rate is needed from a sensor node to a corresponding ECU (e.g., the forward channel) but a much lower data rate is needed from a corresponding ECU to a sensor node (e.g., the backward channel). An example use case for asymmetrical communications in an IVN may be a camera (e.g., a vehicle backup camera), where a high data rate is needed from the camera to a control/display ECU (e.g., the forward channel) but a much lower data rate is needed from the control/display ECU to the camera (e.g., the backward channel). Another example use case for asymmetrical communications in an IVN may be a LiDAR sensor or a radar, where a high data rate is needed from the LiDAR sensor or the radar to a control/display ECU (e.g., the forward channel) but a much lower data rate is needed from the control/display ECU to the LiDAR sensor or the radar (e.g., the backward channel). In some other embodiments, communications between the communications devices 102-1, 102-2 are "symmetrical." In symmetrical communications, both communications devices transmit and receive data at the same data rate. For example, in an Ethernet-based point-to-point network both communications devices may transmit and receive at, for example, 10 Gbps.

For symmetrical simultaneous bi-directional communication over a shared transmission medium, transceivers need to separate received signals from their own transmitted signals as these signal components are super-positioned on the medium. Channel reflections of a transmit signal interfere with a received signal such that transceivers need to implement echo-cancellation to eliminate reflections. For pulse-amplitude modulated transceivers, the echo cancellation is typically accomplished with a finite-impulse-response filter with adaptive coefficients that takes the known transmitter (TX) symbols as input and creates a replica transmit response to subtract it from the received signal. Correlation of a TX symbol sequence with the delta signal across a slicer is used to adapt the filter coefficients to the actual channel response. The number of taps of the filter scales with baud rate and channel length as the roundtrip delay of the channel expressed in symbol times scales inverse-proportional to the baud rate. For example, the round-trip delay for 6 GBd across a 15-meter communications channel may be around 1000 symbol periods depending on channel materials, which makes that the power of echo-cancellation becomes a significant factor for higher data rates and/or longer link length. In links that are optimized for highly asymmetrical traffic, the signaling scheme for each data direction is typically different to exploit asymmetry for simplification of the solution. For example, in one direction low speed data is transmitted at a low baud rate using the low frequency part of the spectrum, while in the other direction high-speed data is transmitted at a high rate using the high frequency part of the spectrum. Frequency-division multiplex (FDM) allows to split data streams in each direction using filters, which can reduce or even eliminate the need for echo-cancellation. However, an FDM scheme is typically not able to be used to transport high-speed payload in both directions or more generally enable flexible allocation of bandwidth for each direction.

In the embodiment depicted in FIG. 1, the communications devices 102-1, 102-2 are configured to determine a time-division multiplex (TDM) communications schedule over the asymmetrical communications link 104 between the communications devices 102-1, 102-2. In these embodiments, the TDM communications schedule specifies non-overlapping transmission time slots for different communications devices and a silent period for echo fade-out between consecutive transmission time slots of the non-overlapping transmission time slots. Each of the communications devices 102-1, 102-2 is configured to transmit or receive data according to the TDM communications schedule over the asymmetrical communications link. By transmitting data in non-overlapping transmission time slots for different communications devices and having a silent period for echo fade-out between consecutive transmission time slots, signal echo caused by signal transmission of the communications device 102-1 or 102-2 has largely faded out before the communications devices start to receive data. Consequently, the need for signal echo cancellation in the communications devices 102-1, 102-2 can be reduced and power consumption for signal echo cancellation can be lowered. In some embodiments, at least one of the communications devices 102-1, 102-2 (e.g., the transceiver 108-1 or the transceiver 108-2) is configured to transmit or receive data according to the TDM communications schedule over the asymmetrical communications link without echo cancellation. In an embodiment, at least one of the communications devices 102-1, 102-2 does not include an echo canceller. In another embodiment, at least one of the communications devices 102-1, 102-2 includes a disabled echo canceller. In addition, compared to frequency-division multiplex (FDM), time-division multiplex (TDM) can be used to transmit high-speed payload in both directions or more generally enable flexible allocation of bandwidth for each direction.

In the embodiment depicted in FIG. 1, each of the communications devices 102-1, 102-2 includes a controller 106-1 or 106-2 and a transceiver 108-1 or 108-2 operably connected to the corresponding controller. In some embodiments, at least one of the controllers 106-1, 106-2 is implemented within a processor, such as a microcontroller, a host processor, a host, a digital signal processor (DSP), or a central processing unit (CPU), which can be integrated in a sensor or actuator device or integrated in a corresponding transceiver. In some embodiments, at least one of the transceivers 108-1, 108-2 includes a physical layer (PHY) device. A time-division multiplex (TDM) scheme typically requires a hand-over mechanism to determine which transceiver transmits at what time. One possible solution for hand-over is that one transceiver stops transmitting and becomes silent and the other transceiver detects the silence and starts transmitting at the desired time. However, the fading echo may delay silence detection and increase the silent periods, therefore causing bandwidth loss. Another solution is to run a time schedule with certain fixed, possibly configurable, lengths for data transmission in one direction, data transmission in the other direction, and the silent periods, which requires the transceivers (PHYs) 108-1, 108-2 to have a common notion of time to know when they should transmit and receive. Note that some PHY types, for example Ethernet BASE-T1 PHYs that support Energy-Efficient Ethernet (EEE), already include a time schedule that requires a common notion of time between transceivers. A similar scheme can be exploited to schedule traffic in each direction. Another solution is let one device determine the TDM schedule, by initially transmitting continuously and indicating in the content of data stream, where a link partner is allowed to transmit when both devices switch to TDM at a negotiated time. The allocated bandwidth for each direction might be (auto) negotiated between devices, for example with a signaling scheme before the higher speed communications start. In some embodiments, each of the controllers 106-1, 106-2 is configured to determine a TDM communications schedule over the asymmetrical communications link 104. In these embodiments, each of the transceivers 108-1, 108-2 is configured to transmit or receive data according to the TDM communications schedule over the asymmetrical communications link.

Figure 2:
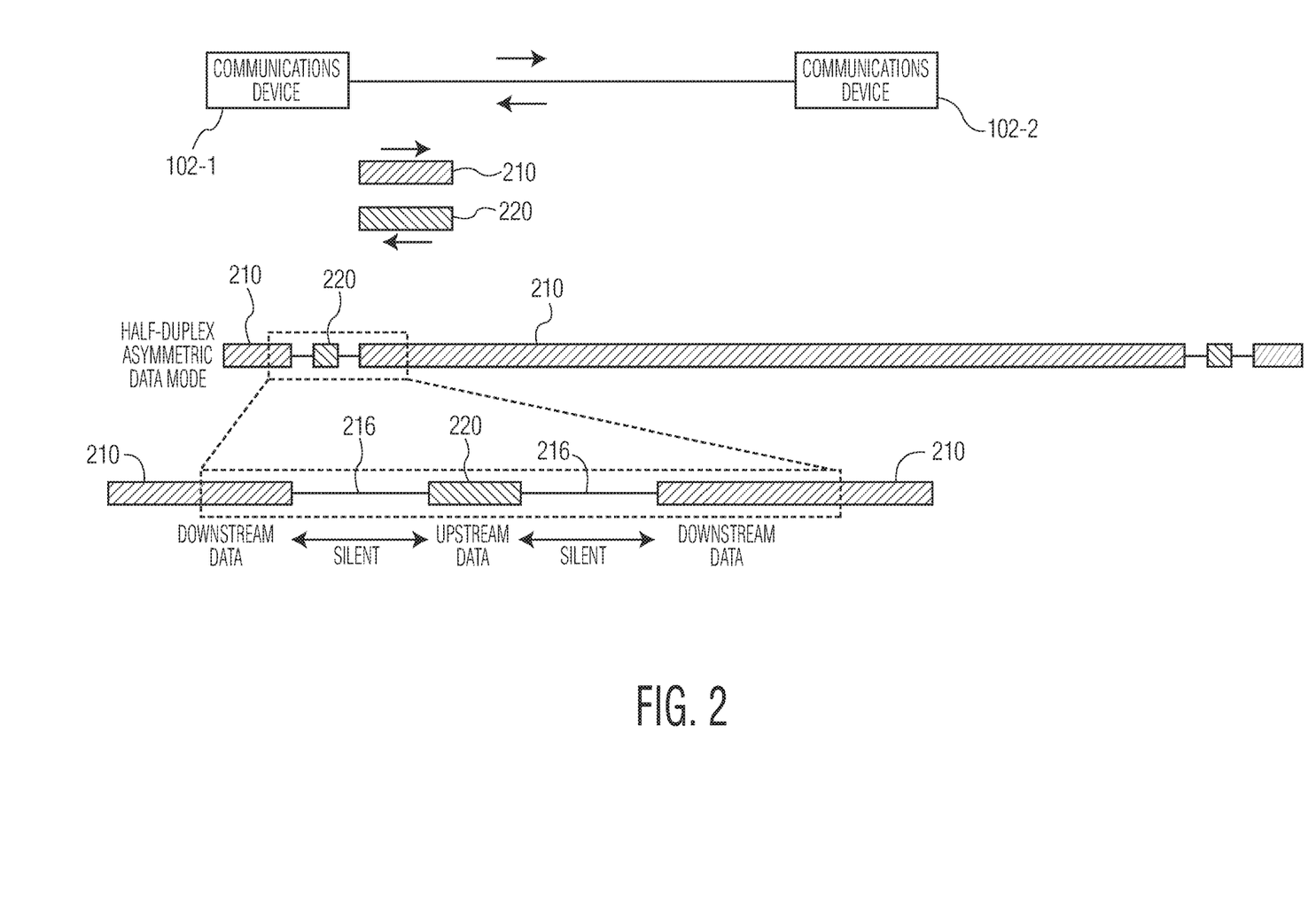
FIG. 2 illustrates some examples of asymmetric data communications that can be conducted by the communications devices depicted in FIG. 1.

FIG. 2 illustrates some examples of asymmetric data communications that can be conducted by the communications devices 102-1, 102-2 depicted in FIG. 1. However, data communications that can be conducted by the communications devices 102-1, 102-2 are not limited to the examples illustrated in FIG. 2. As illustrated in FIG. 2, downstream data 210 is transmitted in the direction from the communications device 102-1 to the communications device 102-2 and upstream data 220 is transmitted in the direction from the communications device 102-2 to the communications device 102-1. In the asymmetric data communications illustrated in FIG. 2, the need for echo-cancellation can be eliminated because the transceivers 108-1, 108-2 of the communications devices 102-1, 102-2 do not transmit data over the communications link 104 at the same time (i.e., half-duplex data communications). Specifically, the transceivers 108-1, 108-2 of the communications devices 102-1, 102-2 transmit data onto the communications link 104 according to a time-division multiplex (TDM) schedule that has a sufficiently large silent period 216 between the time point at which one transceiver stops transmission and the time point at which the other transceiver starts transmission to allow the echo of the previous transmission fade away before the first transceiver starts to receive data from the other transceiver. For time-division multiplex, the total available throughput is shared between two directions of the asymmetric data communications such that some of the bandwidth in one direction may be sacrificed to enable data transmission in the other direction. For highly asymmetrical links, the penalty on the high-speed direction can be made small by using a large duty-cycle factor with longer periods of data transmission in one direction and shorter periods of data transmission in the other direction. Conceptually, such a TDM scheme allows flexibly trading bandwidth in each direction if the sum doesn't exceed the total available bandwidth. An implication of time-multiplex is that the communications link 104 is not available all the time for one direction if there is some data to be transmitted in another direction. However, sensor data can be in bursts with periods of high-speed data interleaved with periods with little or no data. For example, a display link includes large bursts of pixel data covering an image frame, interleaved with blanking periods with little or no data. If the time schedule of the time-multiplexed link is aligned with the application-related time-schedule, there may be no bandwidth penalty at all for the high-speed direction.

Turning back to FIG. 1, in some embodiments, at least one of the communications devices 102-1, 102-2 is configured to adjust the TDM communications schedule over the asymmetrical communications link 104 based on a bandwidth in one direction of the asymmetrical communications link. In an embodiment, at least one of the communications devices is configured to adjust the length of at least one of the non-overlapping transmission time slots of the TDM communications schedule. In some embodiments, at least one of the communications devices is configured to determine a time duration of the silent period of the TDM communications schedule based on a communication channel length of the asymmetrical communications link and/or based on a baud rate of the asymmetrical communications link.

For PHYs that have a frame-structure in the data payload, it is beneficial (e.g., to increase transmission throughput) that data transmission periods cover an integer number of data frames. In some embodiments, at least one of the non-overlapping transmission time slots specified in the TDM communications schedule contains time to transmit an integer number of data frames. In an example, data frames are data structures that contain a certain number of line symbols that may be originating from coding schemes (e.g., Reed-Solomon) or data packetization. In addition, if the silent periods correspond with an integer number of frames, the total time schedule can be made synchronous to the frame clock.

Training of a TDM communication link (e.g., the communications link 104 in FIG. 1) can be accomplished in multiple ways. In some embodiments, each of the communications devices 102-1, 102-2 is configured to train a communications link (e.g., the asymmetrical communications link 104) prior to, at the communications device, transmitting or receiving data according to the TDM communications schedule over the communications link (e.g., the asymmetrical communications link 104). If the transceivers 108-1, 108-2 of the communications devices 102-1, 102-2 also supports simultaneous bidirectional communication, simultaneous bidirectional operation can be trained first. In some embodiments, each of the communications devices 102-1, 102-2 is configured to conduct simultaneous bidirectional transmission over a communications link (e.g., the asymmetrical communications link 104) with echo cancellation prior to, at the communications device, transmitting or receiving data according to the TDM communications schedule over the asymmetrical communications link without echo cancellation. At the end of the simultaneous bidirectional operation training, both transceivers 108-1, 108-2 can transmit and receive data continuously with echo-cancellation enabled. After the simultaneous bidirectional operation training, the TDM communications schedule is installed by allowing each transceiver only to transmit during its own TDM transmit slot and be silent otherwise, which allows echo-cancellation to be turned off.

Alternatively, training of a TDM communication link (e.g., the asymmetrical communications link 104) can be accomplished if initially only one of two transceivers transmits continuously while the other transceiver is receiving but stays silent. For example, in a direction of a communications link (e.g., the asymmetrical communications link 104), continuous transmission is conducted from a first transceiver (e.g., the transceiver 108-1 or 108-2) to a second transceiver (e.g., the transceiver 108-2 or 108-1) while the second transceiver (e.g., the transceiver 108-2 or 108-1) does not transmit data over the communications link (e.g., the asymmetrical communications link 104). After a communications link (e.g., the asymmetrical communications link 104) is trained in one direction, the first transceiver stops transmitting outside its own transmit slot and the communications link becomes silent, e.g., during the part of the TDM communications schedule that includes the transmit slot for the other transceiver. At this moment, the other transceiver can start transmitting during its own transmit slot. The first transceiver, which is already aware of the TDM communications schedule, can train now to the received signal from the other transceiver. A benefit of this training technique is that transceivers don't have to support simultaneous bidirectional transmission and maybe implemented without echo-canceller. In some embodiments, each of the communications devices 102-1, 102-2 is configured to train a communications link (e.g., the asymmetrical communications link 104) using a transmission time slot that is shorter than the non-overlapping transmission time slots specified in the TDM communications schedule. In some embodiments, the low throughput direction is trained first. Alternatively, the high throughput direction is trained first. However, if the initially trained direction is the high-throughput direction in TDM mode, training of the low-throughput direction may be compromised due to short transmit time slots in that direction. Starting with training the low-throughput direction first is an option. However, this may not always be possible as the transceiver that starts to transmit first must have the master clock. Therefore, alternatively the TDM communications schedule may be adapted to facilitate faster training by extending the transmit slot in the direction of training and reducing the transmit slot for the other direction accordingly. When training of the communications link completes, the TDM communications schedule can be restored to the desired transmit slot lengths based on desired throughput for normal operation.

Figure 3:
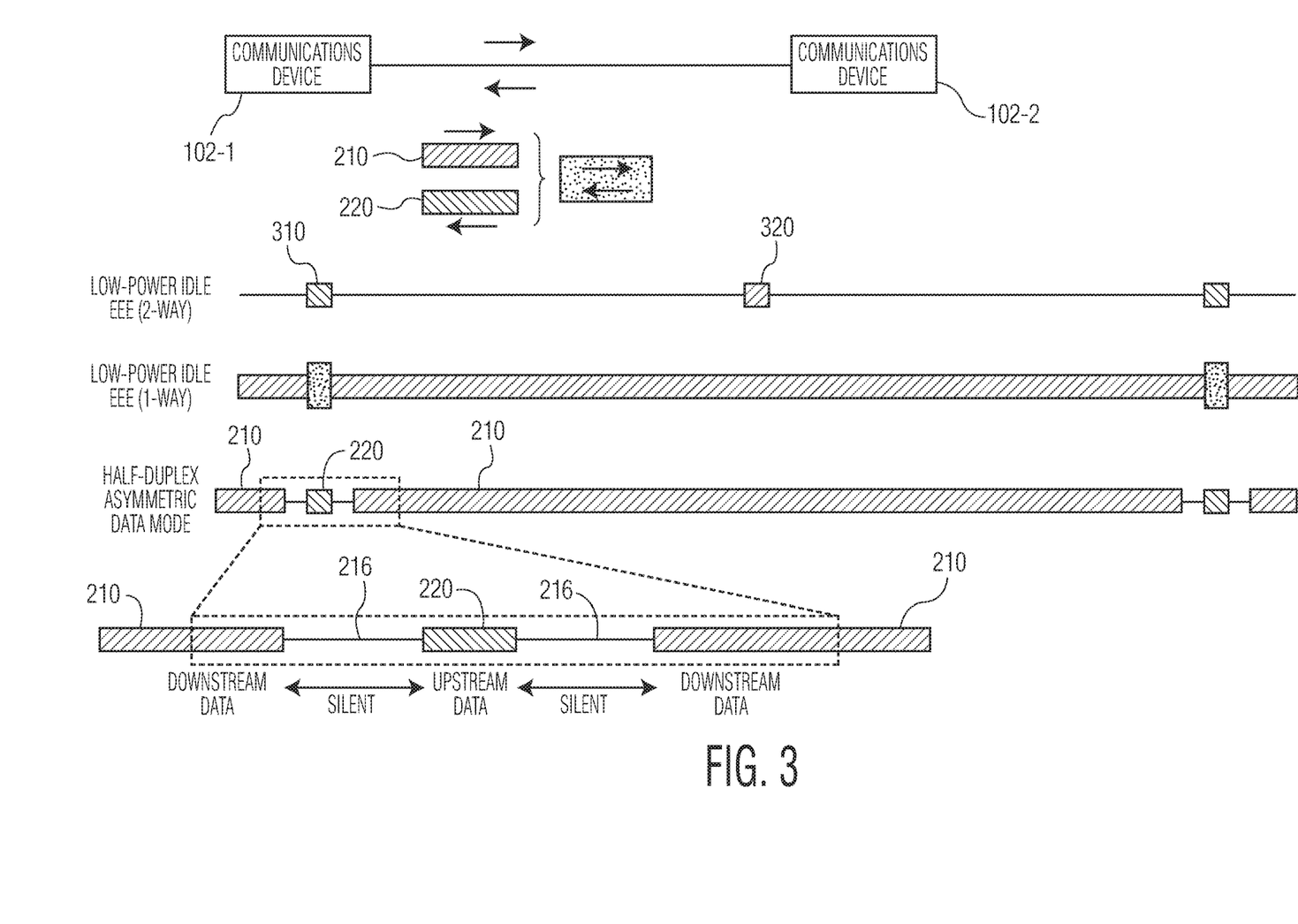
FIG. 3 shows a comparison between one-way and two-way low-power idle of energy-efficient Ethernet and asymmetric data communication with non-overlapping upstream and downstream data.

FIG. 3 shows a comparison between one-way and two-way Low-Power Idle of Energy-Efficient Ethernet and asymmetric data communication with non-overlapping upstream and downstream data. Data communications that can be conducted by the communications devices 102-1, 102-2 are not limited to the examples illustrated in FIG. 3. As in the asymmetric data communications illustrated in FIG. 2, downstream data 210 is transmitted in the direction from the communications device 102-1 to the communications device 102-2 and upstream data 220 is transmitted in the direction from the communications device 102-2 to the communications device 102-1. The transceivers 108-1, 108-2 of the communications devices 102-1, 102-2 transmits data onto the communications link 104 according to a TDM schedule that has a sufficiently large silent period 216 between a first time point at which a first transceiver stops transmission and a second time point at which the other transceiver starts transmission to allow the echo of the previous transmission fade away before the first transceiver starts to receive data from the other transceiver (i.e., half-duplex data communications). In two-way low-power EEE idle mode, both transceivers (e.g., the transceivers 108-1, 108-2) send out small data bursts 310, 320 at refresh periods while in one-way low-power EEE idle mode, only one transceiver (e.g., the transceivers 108-1) send out small data bursts at refresh periods, while the other transceiver transmits continuously. For some transceivers, e.g., Ethernet BASE-T1 PHYs that support Energy-Efficient Ethernet (EEE), the TDM communications cycle can be aligned with the EEE quiet-refresh cycles. In some embodiments, at least one of the communications devices 102-1, 102-2 is configured to synchronize with an EEE communications schedule. For example, one transceiver (e.g., the transceiver 108-1 or 108-2) with low payload transmits periodically during or around its refresh period, and the other transceiver (e.g., the transceiver 108-2 or 108-1) can transmit the remaining time of the quiet-refresh cycle, obeying silent periods to hand-over transmission. In some embodiments, at least one of the communications devices 102-1, 102-2 does not utilize the maximum available bandwidth in the TDM scheme. In some embodiments, at least one of the communications devices is configured to transmit data only during a fraction of an assigned transmission time slot according to the TDM communications schedule over the asymmetrical communications link. In an embodiment, at least one of the communications devices is configured to transmit data only once during multiple TDM cycles over the asymmetrical communications link. If the transceiver 108-1 or 108-2 plans to send less data during its slot in the TDM cycle, the transceiver can stop driving early and the communications link becomes silent for the non-utilized part of the slot. If the data demand from each transceiver becomes low, there will only be periodic short data burst that may be aligned with EEE refresh periods, resulting with the communications link being silent or idle most of the time. A key difference with the standard EEE schedule is that transceivers do not transmit simultaneously during TDM operation. When there is no data at all, a transceiver sends refreshes only (i.e., without data) to keep the communications link alive. With such a TDM scheme, there is no need to be prepared to restart transmission at any time during the cycle, because the transmission time slots are known from the TDM schedule. Consequently, compared to a standard EEE scheme, further power savings on top of the power savings for not using echo-cancellation can be achieved.

Figure 4:
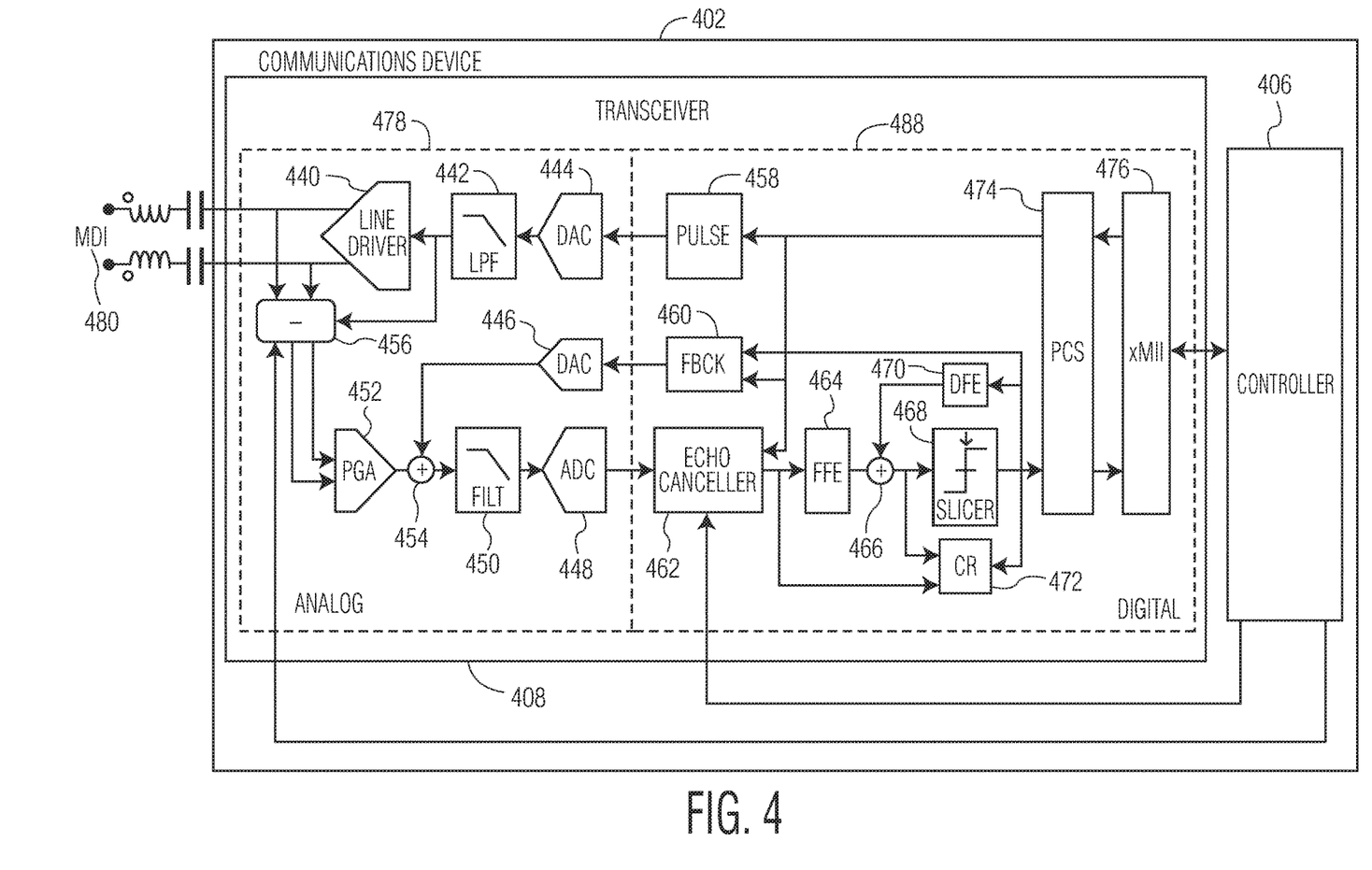
FIG. 4 depicts an embodiment of a communications device.

FIG. 4 illustrates a communications device 402 that can be used in the communications network 100. The communications device 402 depicted in FIG. 4 is an embodiment of the communications devices 102-1, 102-2 depicted in FIG. 1. However, the communications devices 102-1, 102-2 depicted in FIG. 1 are not limited to the embodiment shown in FIG. 4. In some embodiments, the communications device is an Ethernet communications device that is compatible with one or more BASE-T1 physical layer (PHY) communication protocols (e.g., IEEE 802.3ch (10 GBASE-T1)). In the embodiment depicted in FIG. 4, the communications device 402 includes a controller 406, which may be implemented within a processor, such as a microcontroller, a host processor, a host, a DSP, or a CPU, and a transceiver 408 operably connected to the controller. The controller and transceiver may also be integrated in one device. In some embodiments, the transceiver includes a PHY device. In some embodiments, the controller 406 is configured to determine a communications schedule over a communications link and the transceiver 408 is configured to transmit or receive data according to the communications schedule over the communications link. In the embodiment depicted in FIG. 4, the transceiver includes an analog transceiver unit 478 that includes a line driver 440, a low-pass filter (LPF) 442, digital to analog converters (DACs) 444, 446, an analog to digital converter (ADC) 448, a filter 450, a programmable gain amplifier (PGA) 452, an summer/adder circuit 454, and an optional hybrid unit 456 used to discriminate received from transmitted signals and reduce required ADC performance, and a digital transceiver unit 488 that includes a pulse shaper 458, a feedback unit (FBCK) 460, an optional echo canceller 462, a feed-forward equalizer (FFE) 464, an summer/adder circuit 466, a slicer 468, a decision feedback equalizer (DFE) 470, a clock recovery circuit (CR) 472, a physical coding sublayer (PCS) 474, and a media-independent interface (MII) (e.g., reduced media-independent interface (RMII), gigabit media-independent interface (GMII), reduced gigabit media-independent interface (RGMII), 10-gigabit media-independent interface (XGMII) and serial gigabit media-independent interface (SGMII), etc., referred to collectively as "xMII") 476. The transceiver is connected to the communication link via a media-dependent interface (MDI) 480. The transceiver may include additional components between the transceiver and the MDI, such as at least one AC-coupling capacitor, at least one common-mode choke, and/or at least one transformer. In some embodiments, the echo canceller is connected in parallel with the FFE instead of in cascade. In some embodiments, the feedback DAC output is subtracted before the PGA, instead of after the PGA. In some embodiments, the DAC and the line driver functionality is merged or combined in the transmit path. In some embodiments, the LPF is behind and/or integrated inside the line driver. In some embodiments, the communications device does not include the hybrid unit and/or the echo canceller, which can result in circuit area and/or component cost savings. For example, the communications device is used for asymmetrical communications, in which the hybrid unit and the echo canceller are not required.

Transceivers that are optimized for symmetrical communications tend to be power inefficient for asymmetrical payloads while transceivers optimized for asymmetrical operation are typically not able to transport symmetrical payload or only at substantially compromised performance. For example, links with highly asymmetrical payload typically utilize different PHY solutions than links with a largely symmetrical payload. Asymmetrical links to sensors and displays tend to utilize asymmetrical PHY solutions while for symmetrical links, Ethernet PHYs are used. In order to operate in more applications with a single type of PHY, there have been investigations to add an additional mode of operation for asymmetrical traffic into PHYs that are primarily intended for symmetrical traffic. However, adding a frequency-division multiplexed operation mode into symmetrical high-speed bidirectional PHY, tends to be a theoretical solution as there is limited synergy between the concepts and separate solutions are more efficient. The transceiver 408 depicted in FIG. 4, which can be an Ethernet transceiver, can efficiently support both symmetrical and asymmetrical use cases. For example, the echo canceller 462 and/or the hybrid unit 456 can be disabled by the controller 406, e.g., when the communications device transmits data according to a TDM communications schedule. The disabled echo canceller and/or the disabled hybrid unit can be enabled by the controller to support simultaneous bidirectional transmission over a communications link (e.g., the asymmetrical communications link 104).

In some embodiments, the controller 406 is configured to determine a half-duplex communications mode for the communications device 402 and in response to determining the half-duplex communications mode for the communications device, disable the echo canceller 462 of the communications device and determine a TDM communications schedule over a point-to-point communications link. The TDM communications schedule may specify multiple non-overlapping transmission time slots for different communications devices and a silent period for echo fade-out between consecutive transmission time slots of the non-overlapping transmission time slots. In these embodiments, the transceiver 408 is configured to, in response to disabling the echo canceller and determining the TDM communications schedule over the point-to-point communications link, conduct data transmission over the point-to-point communications link according to the TDM communications schedule without echo cancellation. In an embodiment, wherein the controller is further configured to determine a full-duplex communications mode for the communications device, in response to determining the full-duplex communications mode for the communications device, enable the echo canceller of the communications device. In this embodiment, the transceiver is configured to, in response to enabling the echo canceller, conduct simultaneous bidirectional transmission over the point-to-point communications link with echo cancellation at the communications device. In some embodiments, the transceiver 408 and/or the controller is configured to train the point-to-point communications link prior to conducting the data transmission over the point-to-point communications link according to the TDM communications schedule without echo cancellation at the communications device. In an embodiment, the transceiver is further configured to, in a first direction of the point-to-point communications link, conduct continuous transmission from the transceiver to another transceiver while another transceiver does not transmit data. The transceiver and/or the controller may be configured to train the point-to-point communications link using a transmission time slot that is shorter than the non-overlapping transmission time slots. In an embodiment, the transceiver and/or the controller is further configured to extend a training transmit slot in a direction of training and reduce a transmission slot for a direction of the point-to-point communications link that is opposite to the direction of training. In some embodiments, the transceiver is further configured to transmit data only during a fraction of an assigned transmission time slot according to the TDM communications schedule over the point-to-point communications link. The controller may be further configured to determine a time duration of the silent period based on a communications channel length of the point-to-point communications link and/or based on a baud rate of the point-to-point communications link. The controller may be further configured to adjust the TDM communications schedule over the point-to-point communications link based on a bandwidth in one direction of the point-to-point communications link. The controller can adjust a length of at least one of the non-overlapping transmission time slots of the TDM communications schedule. In some embodiments, the controller is further configured to synchronize with an Energy-Efficient Ethernet (EEE) communications schedule. In some embodiments, communications in different directions of the point-to-point communications link occur at different effective data rates (i.e., the point-to-point communications link being asymmetrical) for at least a time duration. For example, different effective data rates in different directions can be accomplished using the same signaling speed for both direction and asymmetrical time slot allocation and/or using different signaling speeds for each direction. Although using slower signaling in the low-bandwidth direction may sound attractive, it takes more time to transfer data, therefore compromising the bandwidth in the opposite direction. Furthermore, it tends to complicate link training and dynamic bandwidth allocation. Therefore, the signaling speed in both directions is typically be chosen equal, handling asymmetric payload with asymmetric time slot allocation.

Figure 5:
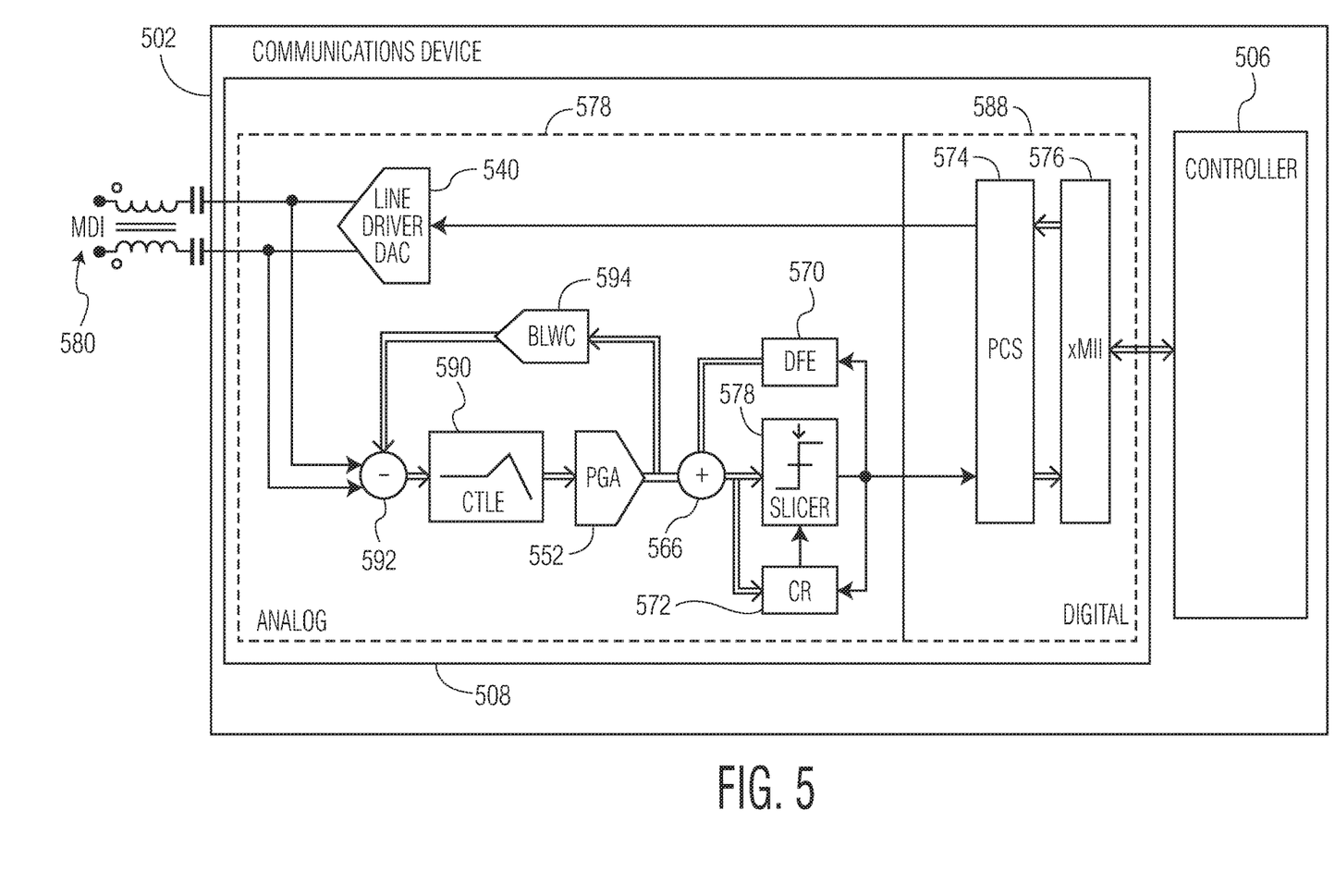
FIG. 5 depicts an embodiment of another communications device.

In case a transceiver only supports an asymmetrical half-duplex mode, a trade-off between analog and digital is possible, which allows further simplification and additional power savings. FIG. 5 illustrates a communications device 502 that only supports the asymmetrical half-duplex mode. The communications device 502 depicted in FIG. 5 is an embodiment of the communications devices 102-1, 102-2 depicted in FIG. 1. However, the communications devices 102-1, 102-2 depicted in FIG. 1 are not limited to the embodiment shown in FIG. 5. A difference between the communications device depicted 502 in FIG. 5 and the communications device depicted 402 in FIG. 4 is that the communications device depicted 502 in FIG. 5 does not include any echo canceller. The prime reason to use an ADC and digital signal processing in the receive path is because of echo cancellation. If echo cancellation is not needed, almost the full receive functionality up to a slicer 568 can be realized in a simpler way and at lower power in the analog domain. In the embodiment depicted in FIG. 5, the communications device 502 includes a controller 506, which may be implemented within a processor, such as a microcontroller, a host processor, a host, a DSP, or a CPU, and a transceiver 508 operably connected to the controller. In some embodiments, the transceiver includes a PHY device. In some embodiments, the controller 506 is configured to determine a TDM communications schedule over an asymmetrical point-to-point link and the transceiver 408 is configured to transmit or receive data according to the TDM communications schedule over the asymmetrical point-to-point link. In the embodiment depicted in FIG. 5, the transceiver includes an analog transceiver unit 578 that includes a continuous time linear equalizer (CTLE) 590, a programmable gain amplifier (PGA) 552, a decision feedback equalizer (DFE) 570, a slicer 568 that can be implemented as an analog comparator, a clock recovery circuit (CR) 572, a summer/adder circuit 566, a line driver 540, a subtractor circuit 592, and an optional baseline-wander correction (BLWC) loop 594, and a digital transceiver unit 588 that includes a physical coding sublayer (PCS) 574 and a media-independent interface (MII) (e.g., reduced media-independent interface (RMII), gigabit media-independent interface (GMII), reduced gigabit media-independent interface (RGMII), 10-gigabit media-independent interface (XG-MII) and serial gigabit media-independent interface (SG-MII), etc., referred to collectively as "xMII") 576. The transceiver is connected via a media-dependent interface (MDI) 580. The transceiver may include additional components between the transceiver and the MDI, such as at least one AC-coupling capacitor, at least one common-mode choke, and/or at least one transformer. Depending on channel properties and line coding scheme, the BLWC loop 594 may be used. The transceiver architecture 508 depicted in FIG. 5 eliminates the need for digital signal processing to recover the data, as the slicer directly delivers recovered data to the digital transceiver unit 588, which is especially beneficial at high data rates, where a DSP consumes significant amount of power typically much more than the amount of power that the CTLE and the DFE consume. The transceiver architecture 508 depicted in FIG. 5 is especially efficient for PAM2 signaling. If signaling with more than two PAM levels is used, multiple analog comparators may be needed with adaptive slicer levels, but conceptually the transceiver architecture remains similar. Furthermore, the TX path can also be simplified. For example, the pulse shaper 458 in the transceiver 408 is intended to minimize the out-of-band spectrum of the transmitter, which is important to minimize echo for full-duplex communication. However, because the transceiver 508 is only used for half-duplex communication, the pulse shaper 458 is not needed in the transceiver 508, and a simplified DAC can be merged with the line driver 540.

In some embodiments, the controller 506 is configured to determine a TDM communications schedule over an asymmetrical point-to-point link, where the TDM communications schedule specifies non-overlapping transmission time slots for different communications devices and a silent period for echo fade-out between consecutive transmission time slots of the non-overlapping transmission time slots. In these embodiments, the transceiver 508 is configured to transmit or receive data according to the TDM communications schedule over the asymmetrical point-to-point link. In some embodiments, at least one of the non-overlapping transmission time slots contains time to transmit an integer number of data frames. In the embodiment depicted in FIG. 5, the transceiver is further configured to transmit or receive the data according to the TDM communications schedule over the asymmetrical point-to-point link without echo cancellation. Communications in different directions of the asymmetrical point-to-point link may occur at different effective data rates. In some embodiments, the controller is further configured to determine a time duration of the silent period based on a communication channel length of the asymmetrical point-to-point link and/or based on a baud rate of the asymmetrical point-to-point link. In some embodiments, the transceiver 508 and/or the controller is configured to train the asymmetrical point-to-point link prior to, at the communications device, transmitting or receiving the data according to the TDM communications schedule over the asymmetrical point-to-point link. For link training, the transceiver may be further configured to, in a first direction of the asymmetrical point-to-point link, conduct continuous transmission from a first transceiver to a second transceiver while the second transceiver does not transmit data over the asymmetrical point-to-point link. In some embodiments, the transceiver and/or the controller is configured to train the asymmetrical point-to-point link using a transmission time slot that is shorter than the non-overlapping transmission time slots. In some embodiments, the transceiver and/or the controller is configured to extend a training transmit slot in a direction of training and reduce a transmission slot for a direction of the asymmetrical point-to-point link that is opposite to the direction of training. In some embodiments, the transceiver is configured to transmit data only during a fraction of an assigned transmission time slot according to the TDM communications schedule over the asymmetrical point-to-point link. In an embodiment, the transceiver is configured to transmit data only once during multiple TDM cycles over the asymmetrical point-to-point link. In some embodiments, the controller is further configured to adjust the TDM communications schedule over the asymmetrical point-to-point link based on a bandwidth in one direction of the asymmetrical point-to-point link and/or adjust a length of at least one of the non-overlapping transmission time slots of the TDM communications schedule. The controller may be further configured to synchronize with an Energy-Efficient Ethernet (EEE) communications schedule. In some embodiments, the low throughput direction is trained first. Alternatively, the high throughput direction is trained first. However, if the initially trained direction is the high-throughput direction in TDM mode, training of the low-throughput direction may be compromised due to short transmit time slots in that direction. Starting with training the low-throughput direction first is an option. However, this may not always be possible as the transceiver that starts to transmit first must have the master clock. Therefore, alternatively the TDM communications schedule may be adapted to facilitate faster training by extending the transmit slot in the direction of training and reducing the transmit slot for the other direction accordingly. When training of the communications link completes, the TDM communications schedule can be restored to the desired transmit slot lengths based on desired throughput for normal operation.

The TDM scheduling techniques described above can also be applied with other time scheduling mechanisms. It is also possible to make bandwidth allocation for each communications direction over a communications link (e.g., the asymmetrical communications link 104) adaptable. In some embodiments, a negotiation mechanism between transceivers is implemented for bandwidth allocation for different directions of a communications link (e.g., the asymmetrical communications link 104).

Figure 6:
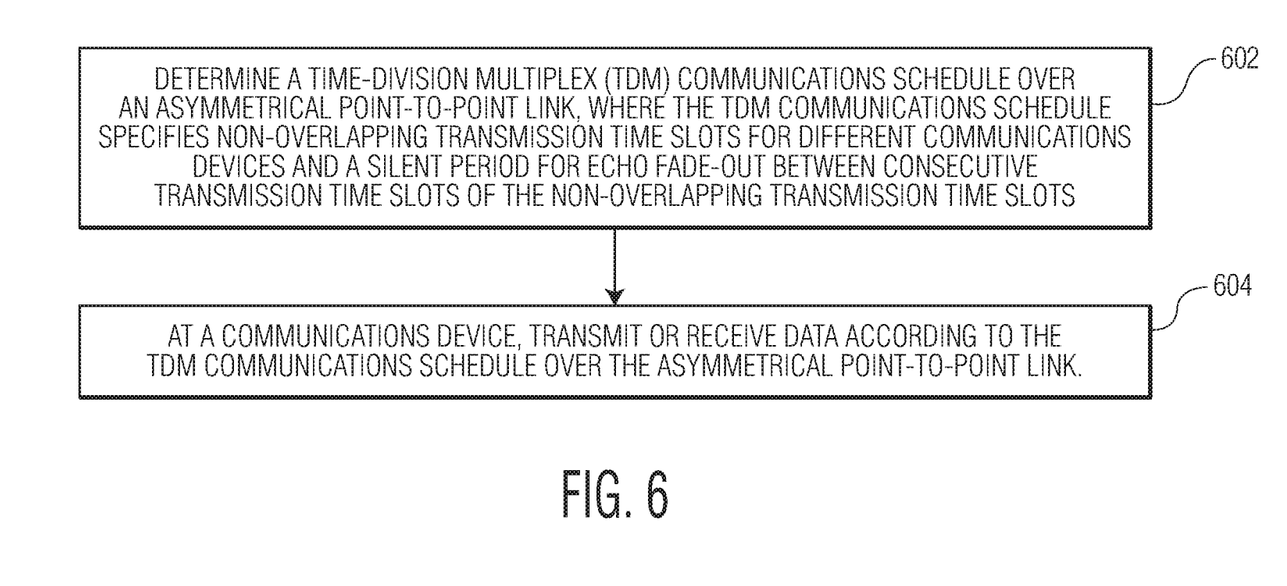
FIG. 6 is a process flow diagram of a method of communications in accordance to an embodiment of the invention.

FIG. 6 is a process flow diagram of a method of communications in accordance to an embodiment of the invention. According to the method, at block 602, a TDM communications schedule over an asymmetrical point-to-point link is determined, where the TDM communications schedule specifies non-overlapping transmission time slots for different communications devices and a silent period for echo fade-out between consecutive transmission time slots of the non-overlapping transmission time slots. At block 604, at a communications device, data is transmitted or received according to the TDM communications schedule over the asymmetrical point-to-point link. The communications device may be similar to, the same as, or a component of the communication devices 102-1, 102-2 depicted in FIG. 1, the communication device 402 depicted in FIG. 4, and/or the communication device 502 depicted in FIG. 5.

Figure 7:
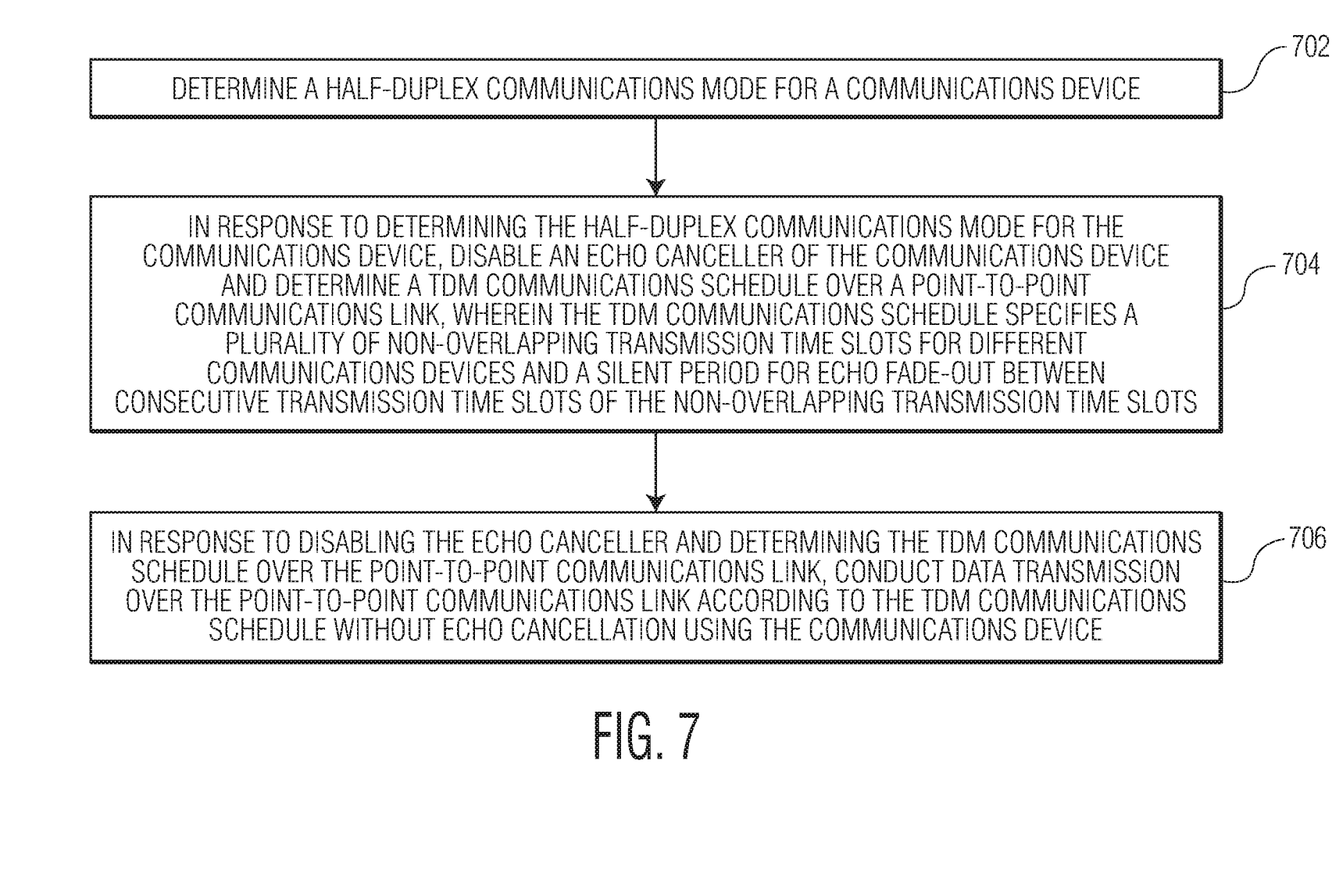
FIG. 7 is a process flow diagram of a method of communications in accordance to another embodiment of the invention.

FIG. 7 is a process flow diagram of a method of communications in accordance to another embodiment of the invention. According to the method, at block 702, a half-duplex communications mode is determined for a communications device. At block 704, in response to determining the half-duplex communications mode for the communications device, an echo canceller of the communications device is disabled and a TDM communications schedule over a point-to-point communications link is determined, where the TDM communications schedule specifies non-overlapping transmission time slots for different communications devices and a silent period for echo fade-out between consecutive transmission time slots of the non-overlapping transmission time slots. At block 706, in response to disabling the echo canceller and determining the TDM communications schedule over the point-to-point communications link, data transmission is conducted over the point-to-point communications link according to the TDM communications schedule without echo cancellation using the communications device. The communications device may be similar to, the same as, or a component of the communication devices 102-1, 102-2 depicted in FIG. 1, the communication device 402 depicted in FIG. 4, and/or the communication device 502 depicted in FIG. 5.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of communications, the method comprising:
determining a half-duplex communications mode for a communications device;
in response to determining the half-duplex communications mode for the communications device, disabling an echo canceller of the communications device and determining a time-division multiplex (TDM) communications schedule over an asymmetrical point-to-point link, wherein communications in different directions of the asymmetrical point-to-point link occur at different data rates, and wherein the TDM communications schedule specifies a plurality of non-overlapping transmission time slots for different communications devices and a silent period for echo fade-out between consecutive transmission time slots of the non-overlapping transmission time slots; and
in response to disabling the echo canceller and determining the TDM communications schedule over the asymmetrical point-to-point link, at the communications device, transmitting or receiving data according to the TDM communications schedule over the asymmetrical point-to-point link without echo cancellation.

2. The method of claim 1, wherein at the communications device, transmitting or receiving data according to the TDM communications schedule over the asymmetrical point-to-point link comprises at the communications device, transmitting or receiving data according to the TDM communications schedule over the asymmetrical point-to-point link without echo cancellation.

3. The method of claim 1, further comprising determining a time duration of the silent period based on a communication channel length of the asymmetrical point-to-point link or based on a baud rate of the asymmetrical point-to-point link.

4. The method of claim 1, further comprising training the asymmetrical point-to-point link prior to, at the communications device, transmitting or receiving the data according to the TDM communications schedule over the asymmetrical point-to-point link.

5. The method of claim 4, wherein training the asymmetrical point-to-point link comprises:
in a first direction of the asymmetrical point-to-point link, conducting continuous transmission from a first transceiver to a second transceiver while the second transceiver does not transmit data over the asymmetrical point-to-point link.

6. The method of claim 5, wherein training the asymmetrical point-to-point link further comprises, in a second direction of the asymmetrical point-to-point link that is opposite to the first direction, transmitting data from the second transceiver to the first transceiver to train the asymmetrical point-to-point link during a time slot assigned to the second transceiver while the first transceiver stops data transmission during the time slot assigned to the second transceiver.

7. The method of claim 4, wherein training the asymmetrical point-to-point link comprises extending a training transmit slot in a direction of training and reducing a transmission slot for a direction of the asymmetrical point-to-point link that is opposite to the direction of training.

8. The method of claim 1, wherein at the communications device, transmitting or receiving the data according to the TDM communications schedule over the asymmetrical point-to-point link comprises at the communications device, transmitting the data only during a fraction of an assigned transmission time slot according to the TDM communications schedule over the asymmetrical point-to-point link.

9. The method of claim 1, further comprising:
adjusting the TDM communications schedule over the asymmetrical point-to-point link based on a bandwidth in one direction of the asymmetrical point-to-point link.

10. The method of claim 1, further comprising:
adjusting a length of at least one of the non-overlapping transmission time slots of the TDM communications schedule.

11. The method of claim 1, further comprising:
synchronizing with an Energy-Efficient Ethernet (EEE) communications schedule.

12. The method of claim 1, wherein at the communications device, transmitting or receiving the data according to the TDM communications schedule over the asymmetrical point-to-point link comprises at the communications device, transmitting the data only once during multiple TDM cycles over the asymmetrical point-to-point link.

13. The method of claim 1, wherein at least one of the non-overlapping transmission time slots contains time to transmit an integer number of data frames.

14. The method of claim 1, wherein the communications device is part of an in-vehicle network (IVN).

15. A communications device comprising:
a controller configured to determine a half-duplex communications mode and in response to determining the half-duplex communications mode, disable an echo canceller of a transceiver of the communications device and determine a time-division multiplex (TDM) communications schedule over an asymmetrical point-to-point link, wherein communications in different directions of the asymmetrical point-to-point link occur at different data rates, and wherein the TDM communications schedule specifies a plurality of non-overlapping transmission time slots for different communications devices and a silent period for echo fade-out between consecutive transmission time slots of the non-overlapping transmission time slots; and
the transceiver configured to in response to disabling the echo canceller and determining the TDM communications schedule over the asymmetrical point-to-point link, transmit or receive data according to the TDM communications schedule over the asymmetrical point-to-point link without echo cancellation.

16. The communications device of claim 15, wherein the transceiver is configured to transmit or receive the data according to the TDM communications schedule over the asymmetrical point-to-point link without echo cancellation.

17. A wired communications network comprising:
a wired transmission media; and
a plurality of communications devices configured to communicate via the wired transmission media, wherein each of the communications devices comprises:
a controller configured to determine a half-duplex communications mode and in response to determining the half-duplex communications mode for the communications device, disable an echo canceller of a transceiver of the communications device and determine a time-division multiplex (TDM) communications schedule over an asymmetrical point-to-point link through the wired transmission media, wherein communications in different directions of the asymmetrical point-to-point link occur at different data rates, and wherein the TDM communications schedule specifies a plurality of non-overlapping transmission time slots for the communications devices and a silent period for echo fade-out between consecutive transmission time slots of the non-overlapping transmission time slots; and
the transceiver configured to in response to disabling the echo canceller and determining the TDM communications schedule over the asymmetrical point-to-point link, transmit or receive data according to the TDM communications schedule over the asymmetrical point-to-point link without echo cancellation.

18. The wired communications network of claim 17, wherein the transceiver of each of the communications devices is configured to transmit or receive the data according to the TDM communications schedule over the asymmetrical point-to-point link without echo cancellation.

* * * * *